(12) United States Patent
Iwasa et al.

(10) Patent No.: US 11,542,102 B2
(45) Date of Patent: Jan. 3, 2023

(54) SUCTION TRANSFER DEVICE

(71) Applicant: ISHIDA CO., LTD., Kyoto (JP)

(72) Inventors: Takuya Iwasa, Ritto (JP); Yuji Yokota, Ritto (JP); Satoshi Nishitsuji, Ritto (JP); Fumitaka Tokuda, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 351 days.

(21) Appl. No.: 16/874,596

(22) Filed: May 14, 2020

(65) Prior Publication Data

US 2020/0361718 A1    Nov. 19, 2020

(30) Foreign Application Priority Data

May 17, 2019 (JP) .............................. JP2019-094038

(51) Int. Cl.
*B65G 47/90* (2006.01)
*B25J 15/06* (2006.01)
(Continued)

(52) U.S. Cl.
CPC .............. *B65G 47/90* (2013.01); *B25J 9/003* (2013.01); *B25J 9/1697* (2013.01);
(Continued)

(58) Field of Classification Search
CPC ... B25J 15/0683; B25J 11/0045; B65G 47/91; B65G 47/914; B65G 2201/0238; B65H 43/18; B66C 1/0206
(Continued)

(56) References Cited

U.S. PATENT DOCUMENTS 3,774,778 A * 11/1973 Flaig .................... B65G 47/918
53/247
4,505,505 A * 3/1985 Senaratne .............. B65G 47/91
294/188
(Continued)

FOREIGN PATENT DOCUMENTS

CN          105905602 A    8/2016
EP            0131866 A1    1/1985
(Continued)

OTHER PUBLICATIONS

Search Report from the corresponding European Patent Application No. 20174570.0 dated Sep. 4, 2020.
(Continued)

*Primary Examiner* — Dean J Kramer
(74) *Attorney, Agent, or Firm* — Shinjyu Global IP

(57) ABSTRACT

A suction transfer device suction-holds a bag-like article with a suction component and moves the suction component suction-holding the article to thereby transfer the article. The suction component has a negative pressure chamber, one or more suction openings, and a first surface. The negative pressure chamber forms a negative pressure space inside when a negative pressure generator is driven. The suction openings communicate with the negative pressure chamber. The first surface is disposed around the suction openings and opposes an article subjected to suction. An area of the first surface is from 0.5 times to 2 times an area of a sucked surface, which opposes the first surface, of the article subjected to suction.

9 Claims, 6 Drawing Sheets

(51) Int. Cl.
   *B25J 11/00* (2006.01)
   *B25J 9/00* (2006.01)
   *B25J 9/16* (2006.01)
   *B65B 43/18* (2006.01)
   *B65G 47/14* (2006.01)

(52) U.S. Cl.
   CPC ....... *B25J 11/0045* (2013.01); *B25J 15/0658* (2013.01); *B25J 15/0683* (2013.01); *B65B 43/18* (2013.01); *B65G 47/1492* (2013.01)

(58) Field of Classification Search
   USPC ........................................................ 294/188
   See application file for complete search history.

(56) References Cited

U.S. PATENT DOCUMENTS

| | | | | |
|---|---|---|---|---|
| 4,917,427 A * | 4/1990 | Scaglia | ................ | B65G 47/91 414/627 |
| 5,088,878 A * | 2/1992 | Focke | ................ | B65G 47/91 414/793 |
| 5,778,640 A * | 7/1998 | Prakken | ................ | B65B 5/061 53/538 |
| 6,244,640 B1 * | 6/2001 | Le Bricquer | ........ | B65G 47/91 294/185 |
| 9,010,827 B2 * | 4/2015 | Regan | ................ | B25J 15/0061 294/188 |
| 10,031,149 B2 * | 7/2018 | Lapham | ............ | G01N 35/0099 |
| 2012/0319416 A1 * | 12/2012 | Ellis | ................ | B25J 15/0616 414/800 |
| 2015/0212508 A1 * | 7/2015 | Miyoshi | ............ | B26F 3/002 700/160 |
| 2015/0239131 A1 * | 8/2015 | Didiot | ................ | A23P 20/20 99/450.2 |
| 2015/0328779 A1 * | 11/2015 | Bowman | ............ | B65H 3/0883 294/188 |

FOREIGN PATENT DOCUMENTS

| | | |
|---|---|---|
| EP | 3079167 A1 | 10/2016 |
| JP | 2002-346962 A | 12/2002 |
| JP | 2010-098178 A | 4/2010 |
| JP | 2016-215285 A | 12/2016 |
| JP | 2018-089732 A | 6/2018 |
| JP | 2018-103317 A | 7/2018 |

OTHER PUBLICATIONS

Office Action from the corresponding Chinese Patent Application No. 202010381353.6 dated Aug. 31, 2021.

Office Action from the corresponding European Patent Application No. 20 174 570.0 dated Sep. 24, 2021.

* cited by examiner

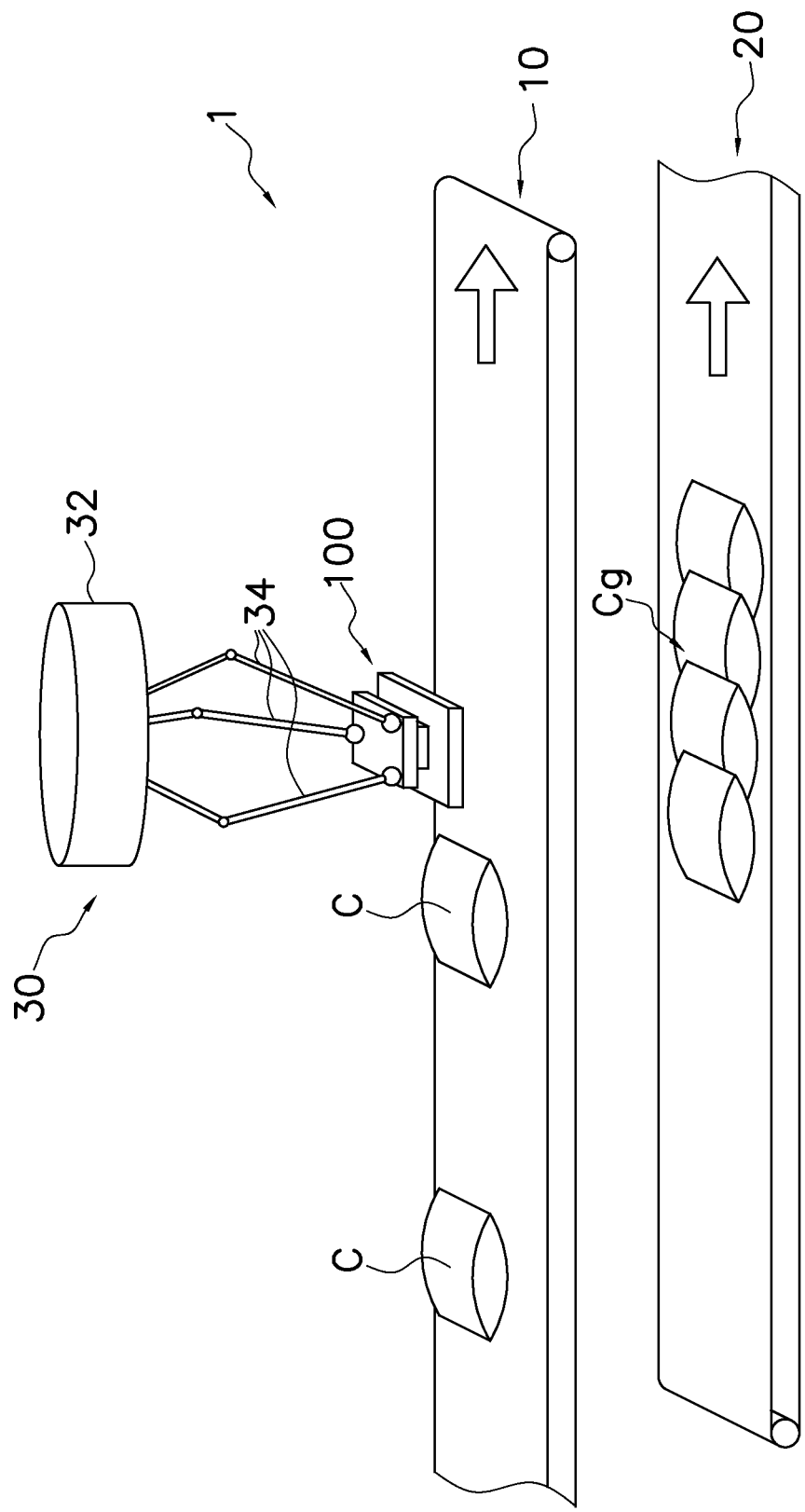
F I G. 1

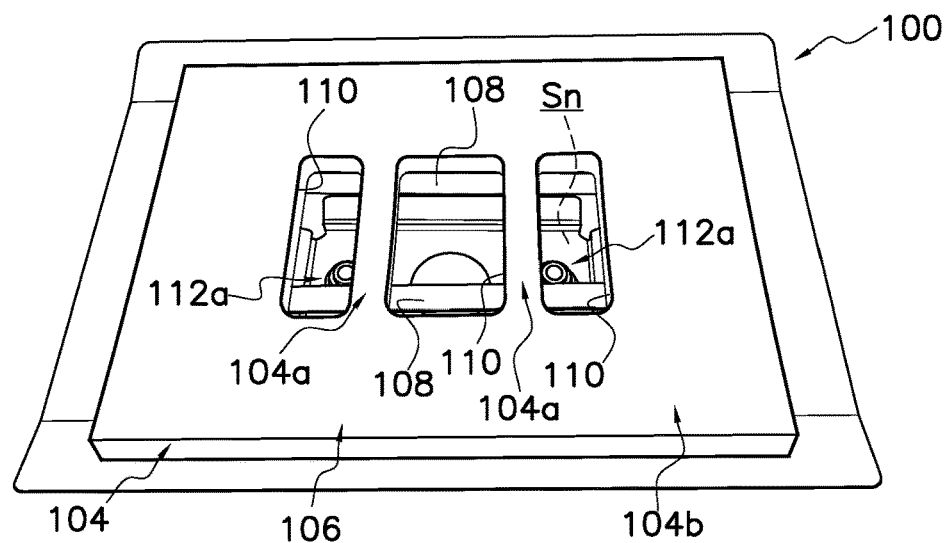
F I G. 5
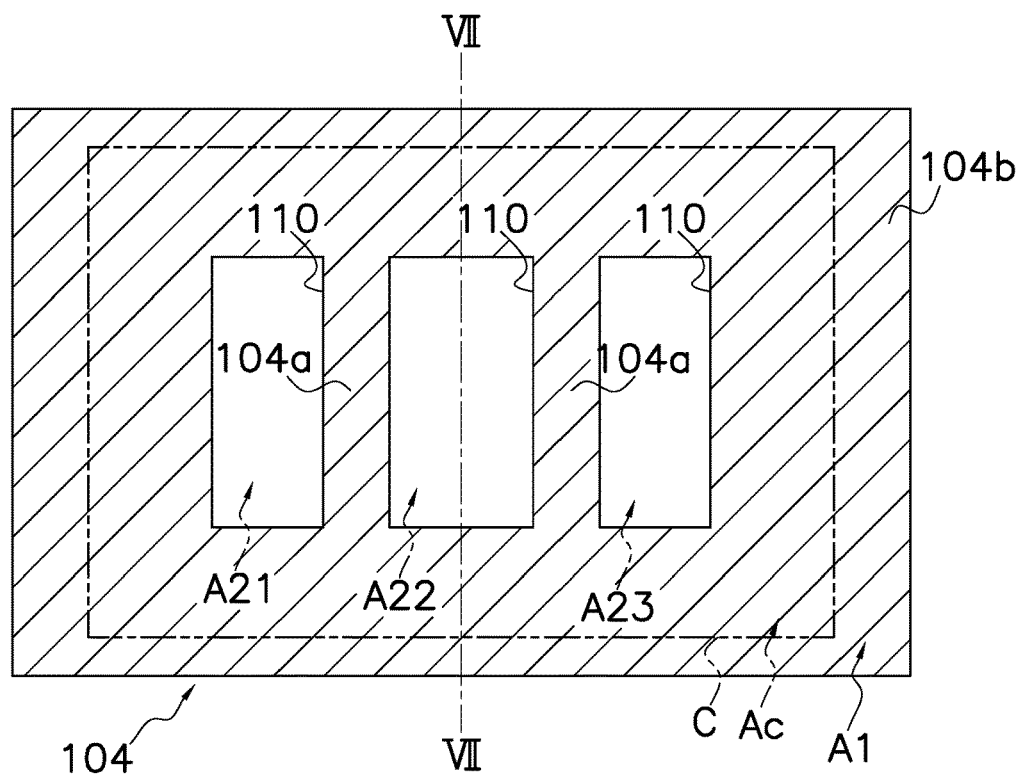
F I G. 6

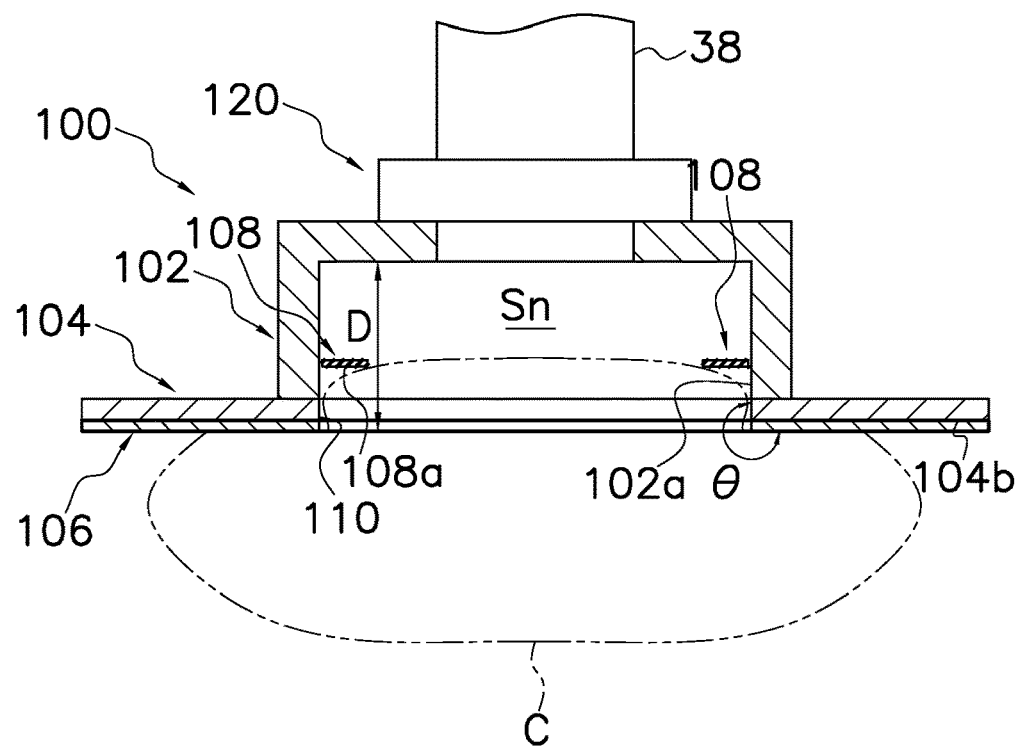
F I G. 7
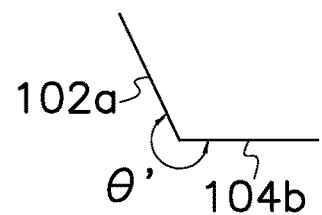
F I G. 8

SUCTION TRANSFER DEVICE

CROSS-REFERENCE TO RELATED APPLICATIONS

This application claims priority to Japanese Patent Application No. 2019-094038, filed May 17, 2019. The contents of that application are incorporated by reference herein in their entirety.

TECHNICAL FIELD

The present invention relates to a suction transfer device. More specifically, the present invention relates to a suction transfer device that suction-holds bag-like articles with a suction component and moves the suction component suction-holding the articles to thereby transfer the articles.

BACKGROUND ART

Conventionally, a suction device is known which, as in Japanese Patent Application Publication No. 2002-346962, presses an annular seal member manufactured of a deformable material such as rubber against a bag-like article and suction-holds the article by switching the pressure inside the seal member to negative pressure.

BRIEF SUMMARY

However, in the case of moving the suction device while suction-holding the article with the narrow annular seal member such as disclosed in Japanese Patent Application Publication No. 2002-346962 to transfer the article, there are cases where the bag-like article becomes deformed by force acting on the article during transfer. When such deformation occurs, there is the potential for problems to arise, such as the suction device drops the article during transfer due to a gap formed between the article and the seal member.

It is an object of the present invention to provide a suction transfer device that suction-holds bag-like articles with a suction component and moves the suction component suction-holding the articles to thereby transfer the articles and with which it is easy to reduce the dropping of the articles.

A suction transfer device pertaining to a first aspect of the invention suction-holds a bag-like article with a suction component and moves the suction component suction-holding the article to thereby transfer the article. The suction component includes a negative pressure chamber, one or more suction openings, and a first surface. The negative pressure chamber forms a negative pressure space therein when a negative pressure generator operates. The suction openings communicate with the negative pressure chamber. The first surface is disposed around the suction openings and opposes an article subjected to suction. The area of the first surface is from 0.5 times to 2 times the area of a sucked surface, which opposes the first surface, of the article subjected to suction.

In the suction transfer device of the first aspect, when forming negative pressure in the space inside the negative pressure chamber to suction-hold the bag-like article at the suction openings, the article can be firmly supported by the first surface of the suction component for which a relatively large area is ensured. For that reason, the occurrence of a situation where the article being suction-held drops due to a gap formed between the bag-like article being suction-held and the suction openings when the suction component sucking the article is moved can be reduced.

A suction transfer device pertaining to a second aspect of the invention is the suction transfer device of the first aspect, wherein a total area of the suction openings is from 0.3 times to 0.6 times the area of the sucked surface of the article subjected to suction.

In the suction transfer device of the second aspect, by ensuring the suction openings with the above-described area, a sufficient size can be ensured for the first surface that supports the bag-like article, and the article can be firmly suction-held by the suction openings.

A suction transfer device pertaining to a third aspect of the invention is the suction transfer device of the first aspect or the second aspect, wherein opening areas of the suction openings are each equal to or greater than 9 $mm^2$.

In the case of forming negative pressure in the space inside the negative pressure chamber to suck the article, a greater suction-holding force at each suction opening can be ensured the larger each suction opening is.

In the suction transfer device of the third aspect, because each suction opening has a relatively large opening area, the article can be firmly suction-held by each suction opening, and the occurrence of a situation where each suction opening unintentionally releases the article can be easily reduced.

A suction transfer device pertaining to a fourth aspect of the invention is the suction transfer device of any of the first aspect to the third aspect, wherein a depth of the negative pressure chamber from the suction openings is equal to or greater than 4 mm.

In the suction transfer device of the fourth aspect, by ensuring a relatively large depth for the negative pressure chamber, the bag-like article deformed by suction can be received inside the negative pressure chamber and can be firmly held.

A suction transfer device pertaining to a fifth aspect of the invention is the suction transfer device of any of the first aspect to the fourth aspect, wherein the suction component further includes a second surface that extends from the suction openings into the negative pressure chamber and intersects the first surface. The angle formed by the first surface and the second surface is greater than 180° and equal to or less than 270°.

In the suction transfer device of the fifth aspect, by setting the angle formed by the first surface and the second surface in the above-described angular range, the occurrence of a situation where the bag-like article gets caught on the member forming the second surface can be reduced. For that reason, this suction transfer device, after the bag-like article has been transferred to a desired position, can quickly cancel the suction-holding to promptly transit to the process of transferring the next article. As a result, an increase in the speed of the suction transfer process can be realized.

A suction transfer device pertaining to a sixth aspect of the invention is the suction transfer device of the fifth aspect, wherein the suction component further includes a third surface that is disposed in the negative pressure chamber and extends in a direction intersecting the second surface.

In the suction transfer device of the sixth aspect, by suppressing, with the third surface, the bag-like article from being excessively pulled into the negative pressure chamber, the occurrence of a situation where the bag-like article gets caught in the negative pressure chamber such that quick release of the article is obstructed when canceling the suction-holding of the article can be reduced.

A suction transfer device pertaining to a seventh aspect of the invention is the suction transfer device of any of the first aspect to the sixth aspect, wherein the first surface is a rigid surface.

In the suction transfer device of the seventh aspect, the first surface is a rigid surface. Therefore, compared to a case where the first surface deforms easily, a gap is less likely to be formed between the first surface and the bag-like article. It is thus easy to firmly support the article.

A suction transfer device pertaining to an eighth aspect of the invention is the suction transfer device of any of the first aspect to the seventh aspect, wherein the suction component further includes a buffer member that is provided on the first surface.

In the suction transfer device of the eighth aspect, the buffer member is provided on the first surface. Therefore, it can be reduced the damage on the bag-like article and the item inside the bag by inhibiting them from contacting the first surface.

A suction transfer device pertaining to a ninth aspect of the invention is the suction transfer device of any of the first aspect to the eighth aspect, wherein the suction component further includes an air discharge component that has air outlets disposed inside the negative pressure chamber and discharges air toward the suction openings.

The suction transfer device of the ninth aspect is configured to be capable of discharging air from inside the negative pressure chamber toward the suction openings. Therefore, when canceling the suction-holding of the article by the suction component, air can be applied to the article that had been held at the suction openings to thereby quickly cancel the suction-holding.

A suction transfer device pertaining to a tenth aspect of the invention is the suction transfer device of any of the first aspect to the ninth aspect, further including a support component that supports the suction component in such a way that the suction component can change its posture.

The bag-like article that is subjected to suction-holding and transfer by this suction transfer device deforms easily. For that reason, in contrast to an article that virtually does not deform such as an article that is put into a box, there is the potential for the same article to take various shapes.

In the suction transfer device of the tenth aspect, the suction component is supported in such a way that it can change its posture. Therefore, it is easy to change the direction the suction openings and the first surface face in conformity with the shape of each article and to firmly suction-hold the article.

A suction transfer device pertaining to an eleventh aspect of the invention is the suction transfer device of any of the first aspect to the tenth aspect, wherein at least part of the first surface is formed in a shape of an arch or a shape of a dome.

In the suction transfer device of the eleventh aspect, it is easy to allow the first surface to conform to the shape of the bag-like article and firmly hold the article with the first surface.

In the suction transfer device pertaining to the invention, the occurrence of a situation where the article being suction-held drops due to a gap formed between the bag-like article being suction-held and the suction openings when the suction component sucking the article is moved to transfer the article can be reduced.

BRIEF DESCRIPTION OF THE DRAWINGS

FIG. 1 is a perspective view generally showing part of a box packing system including a parallel link robot of an embodiment of the suction transfer device pertaining to the invention;

FIG. 5 is a perspective view of the suction component of FIG. 4 as seen from its bottom surface side in which suction openings are formed;

FIG. 6 is a schematic plan view of an article support member, as seen from a first surface side thereof, in a state in which a buffer member of the suction component of FIG. 4 has been detached therefrom, with the long dashed double-short dashed line schematically representing an article suction-held by the suction component;

FIG. 7 is a schematic longitudinal sectional view of the suction component in a case where the suction component is cut along the line VII-VII of FIG. 6, with the long dashed double-short dashed line schematically representing the article suction-held by the suction component;

FIG. 8 schematically shows another example of an angle formed by a first surface and a second surface of the suction component of the parallel link robot;

DETAILED DESCRIPTION

A parallel link robot 30 pertaining to an embodiment of the suction transfer device of the invention will now be described with reference to the drawings.

It will be noted that the parallel link robot 30 described below is merely an embodiment of the suction transfer device of the invention and is not intended to limit the technical scope of the invention. It will be understood that various modifications can be made to the following embodiment without departing from the spirit and scope of the invention.

(1) Overall Configuration

Figure 2:
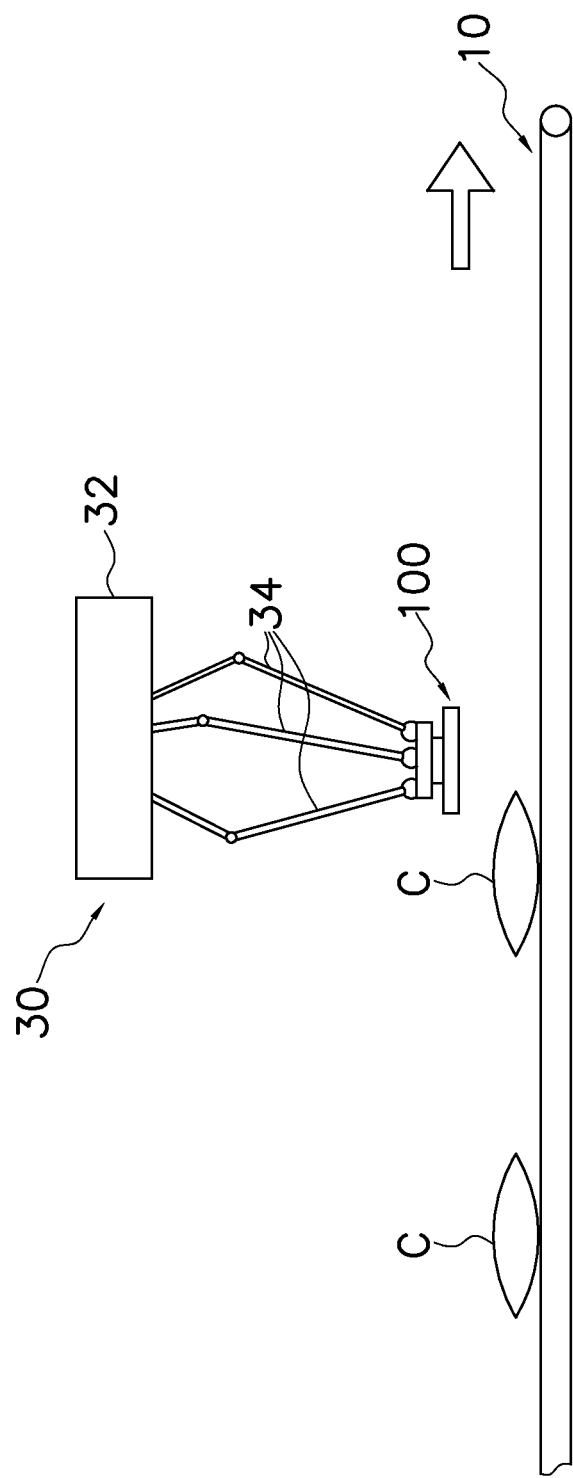
FIG. 2 is a side view generally showing part of the box packing system of FIG. 1.

FIG. 1 is a perspective view generally showing part of a box packing system 1 equipped with the parallel link robot 30 of the embodiment of the invention. FIG. 2 is a side view generally showing part of the box packing system 1. It will be noted that the box packing system 1 is merely an example of an application of the parallel link robot 30, and the parallel link robot 30 can be also utilized for other applications.

The box packing system 1 is, for example, installed on a production line of a food factory. The box packing system 1 is a system that packs a predetermined number of bag-like articles C into each of boxes such as cardboard boxes.

In this embodiment, the articles C are packages in which a fresh vegetable such as sprouts, or a frozen vegetable, for example, is packed in bags. However, the item packed in the bags can also be a food other than a vegetable or can also be an item other than a food. Bags made of polypropylene, polyethylene, PET, or nylon are used to package the articles C, though the packaging of the articles C is not limited.

The box packing system 1 is a system mainly equipped with a first conveyor 10, a second conveyor 20, the parallel link robot 30, and a box packing mechanism not shown in the drawings. The parallel link robot 30 is an example of the suction transfer device. It will be noted that the suction transfer device of the invention is not limited to the parallel link robot 30. The invention is widely applicable to devices configured to suction-hold bag-like articles with a suction component and move the suction component suction-holding the articles to thereby transfer the articles.

On the production line of the food factory where the box packing system 1 is installed, the articles C are produced by a bag-making and packaging machine (not shown in the drawings) installed upstream of the box packing system 1. The articles C produced by the bag-making and packaging machine undergo processes such as a weight inspection and a contamination inspection, for example, and are thereafter placed on the first conveyor 10 of the box packing system 1. The articles C conveyed by the first conveyor 10 are transferred to, and aligned on, the second conveyor 20 by the parallel link robot 30. The parallel link robot 30 arranges a predetermined quantity of the articles C in a predetermined way to form an article group Cg on the second conveyor 20. The box packing mechanism not shown in the drawings uses suction pads not shown in the drawings to suction-hold the entire group of the predetermined quantity of articles C (the article group Cg) arranged on the second conveyor 20 and moves the suction pads in the horizontal direction and the up and down direction to thereby transfer the article group Cg and put it into a box such as a cardboard box not shown in the drawings. It will be noted that although the box packing mechanism here is not the suction transfer device of the invention, a suction transfer device having the characteristics of the invention can also be utilized for the box packing mechanism. The box into which the articles C have been put by the box packing system 1 is conveyed to a subsequent process not shown in the drawings.

(2) Overview of Parallel Link Robot

Figure 3:
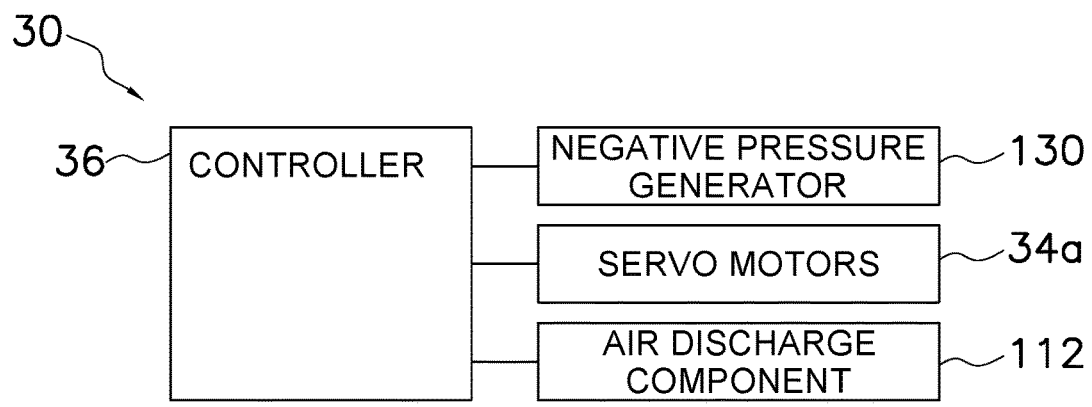
FIG. 3 is a general control block diagram of the parallel link robot of FIG. 1.

An overview of the parallel link robot 30 pertaining to the example of the suction transfer device of the invention will now be described. FIG. 3 is a general control block diagram of the parallel link robot 30.

The parallel link robot 30 is a device that picks up the articles C from the first conveyor 10 in the box packing system 1 and arranges a predetermined quantity of the articles C in a predetermined way to form the article group Cg on the second conveyor 20. It will be noted that this way of utilizing the parallel link robot 30 is merely an example, and the parallel link robot 30 can also, for example, directly put the articles C into boxes such as cardboard boxes conveyed on the second conveyor 20.

In this embodiment, the parallel link robot 30 is a 3-axis parallel link robot. However, the parallel link robot 30 is not limited to a 3-axis parallel link robot and can also be a parallel link robot with more axes.

As shown in FIG. 1 to FIG. 3, the parallel link robot 30 is mainly equipped with a base 32, parallel link arms 34, a suction component 100, and a controller 36.

As shown in FIG. 1, the base 32 is disposed above the first conveyor 10. The base 32 is secured, for example, to a frame of the box packing system 1 not shown in the drawings.

The parallel link arms 34 are driven by servo motors 34a (see FIG. 3). Although FIG. 3 shows only one servo motor 34a, the plural (in this embodiment, three) parallel link arms 34 are driven by mutually different servo motors 34a. Upper ends of the parallel link arms 34 are coupled to output shafts of the servo motors 34a. Lower ends of the parallel link arms 34 hold the single suction component 100 via a support component 120 described later.

The suction component 100 suction-holds the bag-like articles C. The suction component 100 will be described in detail later.

The controller 36 uses a sensor (e.g., a camera) not shown in the drawings to grasp the positions and postures of the articles C on the first conveyor 10 and controls the amount of rotation and the direction of rotation of each output shaft of the plural servo motors 34a so that the later-described suction component 100 can appropriately suction-hold the articles C. The controller 36 moves the lower ends of the three parallel link arms 34 in the horizontal direction and the vertical direction by controlling the servo motors 34a. This allows the parallel link robot 30 to move the suction component 100 to arbitrary positions in a predetermined three-dimensional space. Furthermore, the controller 36 also controls the actions of a negative pressure generator 130 and an air discharge component 112 described later.

Various known parallel link robot configurations can be utilized for the base 32, the parallel link arms 34, and the controller 36. In this disclosure, further description of the base 32, the parallel link arms 34, and the controller 36 is omitted, and just the suction component 100 is described in detail.

(3) Suction Component of Parallel Link Robot

Figure 4:
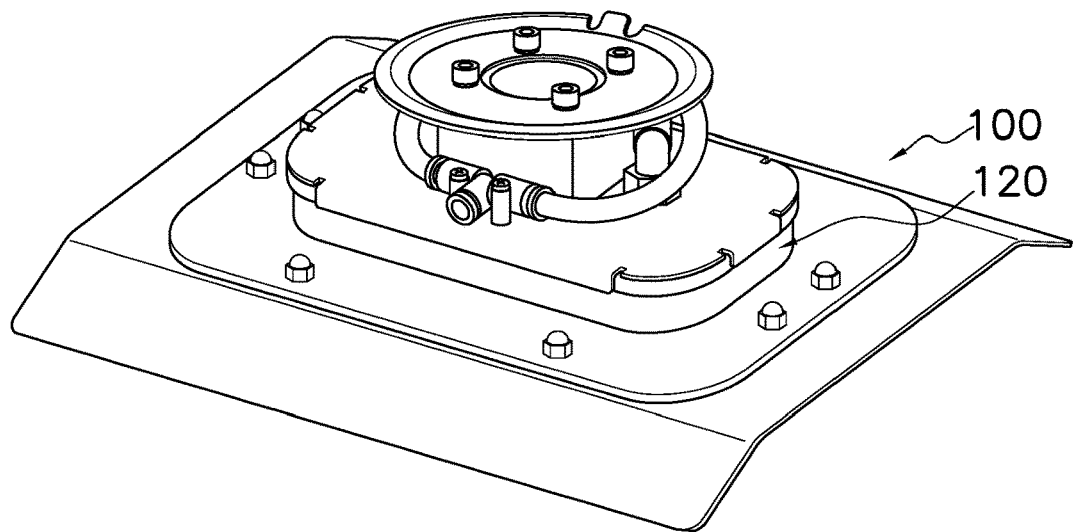
FIG. 4 is a perspective view of a suction component of the parallel link robot of FIG. 1.

The suction component 100 of the parallel link robot 30 serving as an example of the suction transfer device will now be described with reference mainly to FIG. 3 to FIG. 7. FIG. 4 is a perspective view of the suction component 100. FIG. 5 is a perspective view of the suction component 100 as seen from its bottom surface side in which suction openings 110 described later are formed. FIG. 6 is a schematic plan view of an article support member 104, as seen from a first surface 104b side thereof, in a state in which a later-described buffer member 106 of the suction component 100 has been detached therefrom. The long dashed double-short dashed line in FIG. 6 schematically represents an article C suction-held by the suction component 100. FIG. 7 is a schematic longitudinal sectional view of the suction component 100 in a case where the suction component 100 is cut along line VII-VII of FIG. 6. The long dashed double-short dashed line in FIG. 7 schematically represents the article C suction-held by the suction component 100.

The suction component 100 is a member that suction-holds the bag-like article C.

As described in detail later, the suction component 100 has suction openings 110, a negative pressure chamber 102 that communicates with the suction openings 110, and a first surface 104b that is disposed around the suction openings 110 and opposes the article C subjected to suction (see FIG. 7).

It will be noted that the first surface 104b that opposes the article C subjected to suction here does not mean just the portion that actually faces the article C subjected to suction when the parallel link robot 30 is used. The first surface 104b that opposes the article C subjected to suction here includes the entire bottom surface of the suction component 100 that surrounds the suction openings 110 as seen in bottom view (see the hatched portion in FIG. 6). In other words, the first surface 104b that opposes the article C subjected to suction here includes the entire undersurface—that surrounds the suction openings 110—of a later-described article support member 104 in which the suction openings 110 are formed. When the parallel link robot 30 is operated and suction component 100 suction-holds the article C from above, at least part of the first surface 104b covers the article C from above. When the article C is being sucked at the suction openings 110, at least part of the first surface 104b contacts the article C and supports the article C.

The suction component 100 is connected by a suction tube 38 to the negative pressure generator 130 whose actions are controlled by the controller 36 (see FIG. 7). The space inside the negative pressure chamber 102 communicates with the negative pressure generator 130 via the suction tube 38. The negative pressure generator 130 is, for example, a vacuum pump or a vacuum blower. When the negative pressure generator 130 is operated and the air inside the negative pressure chamber 102 is sucked out, a negative pressure space Sn is formed inside the negative pressure chamber 102. Specifically, when the negative pressure generator 130 is operated in a state in which at least part of the first surface 104b is in contact with the article C subjected to suction, the negative pressure space Sn is formed inside the negative pressure chamber 102, the article C is sucked by the suction openings 110, and the article C is suction-held by the suction component 100.

The suction component 100 will now be described in more detail. The suction component 100 is mainly equipped with the negative pressure chamber 102, the article support member 104, a buffer member 106, a pull-in inhibiting member 108, and an air discharge component 112 (see FIG. 3 and FIG. 7).

The negative pressure chamber 102 is, as previously mentioned, a member that forms a space that becomes the negative pressure space Sn when the negative pressure generator 130 is operated (see FIG. 7). When the suction tube 38 is connected to the suction component 100 so as to communicate with the space inside the negative pressure chamber 102 and the negative pressure generator 130 is operated, the air in the space inside the negative pressure chamber 102 is evacuated via the suction tube 38. The space inside the negative pressure chamber 102 communicates with the suction openings 110 on its lower side. For that reason, when the space inside the negative pressure chamber 102 becomes the negative pressure space Sn, the article C is sucked at the suction openings 110.

In this embodiment, the article support member 104 is a tabular member that is attached below the negative pressure chamber 102. It will be noted that the negative pressure chamber 102 and the article support member 104 do not need to be separate members and can also be integrally formed.

In plan view, the suction openings 110 are formed in the central portion of the tabular article support member 104 (see FIG. 6). In this embodiment, three suction openings 110 divided by divider portions 104a are formed in the article support member 104 (see FIG. 6). It will be noted that the number of the suction openings 110 is not limited to three and can also be one or two. Furthermore, the number of the suction openings 110 can also be four or more.

However, the force with which each suction opening 110 sucks the article C becomes smaller the smaller the opening area is. For that reason, if the opening area of each suction opening 110 becomes too small as a result of having increased the number of the suction openings 110, the force with which each suction opening 110 sucks the article C becomes smaller, and there is the potential that holding of the article C by each suction opening 110 is unintentionally canceled when the suction component 100 is moved. In particular, in a case where the suction component 100 is moved at a relatively high speed as with the parallel link robot 30, if the force with which each suction opening 110 sucks the article C is small, holding of the article C by each suction opening 110 tends to be unintentionally canceled when the suction component 100 is moved. For that reason, it is preferred that the opening area of each of the suction openings 110 be equal to or greater than 9 mm². For example, referring to FIG. 6, it is preferred that an opening area A21, an opening area A22, and an opening area A23 of the suction openings 110 each be equal to or greater than 9 mm².

Furthermore, it is preferred that a total opening area A2 of the suction openings 110 be from 0.3 times to 0.6 times an area Ac of a sucked surface of the article C subjected to suction that opposes the first surface 104b. Using the embodiment as an example with reference to FIG. 6, it is preferred that the total opening area A2 (the opening area A21+the opening area A22+the opening area A23) of the suction openings 110 be from 0.3 times to 0.6 times the area Ac of the sucked surface of the article C subjected to suction. It will be noted that here the area Ac of the sucked surface of the article C that opposes the first surface 104b means the area, in plan view, of the article C conveyed on the first conveyor 10 in a normally expected state of conveyance. In a case where there is more than one normally expected state of conveyance, for example, it suffices to use, as the area Ac of the sucked surface of the article C that opposes the first surface 104b, the maximum value of the area, in plan view, of the article C conveyed on the first conveyor 10 in the multiple states of conveyance. By setting the total opening area A2 of the suction openings 110 from 0.3 times to 0.6 times the area Ac of the sucked surface of the article C, a sufficient size can be ensured for the first surface 104b that supports the article C, and the article C can be firmly suction-held by the suction openings 110.

The article support member 104 has, on its lower portion, the aforementioned first surface 104b so as to surround the suction openings 110. The first surface 104b is a surface at least part of which supports the article C when forming negative pressure in the space inside the negative pressure chamber 102 and suction-holding the bag-like article C at the suction openings 110. It will be noted that "at least part of the first surface 104b supports the article C" includes a case where the first surface 104b supports the article C with another member being present between the first surface 104b and the article C. In this embodiment, the first surface 104b is a flat surface. An area A1 of the first surface 104b (the area of the hatched portion in FIG. 6) is from 0.5 times to 2 times the area Ac of the sucked surface, which opposes the first surface 104b, of the article C subjected to suction. Because the suction component 100 has this relatively large first surface 104b, the article C can be firmly supported by the first surface 104b when the suction component 100 sucking the article C is moved. As a result, the occurrence of a situation where the article C being suction-held drops when the suction component 100 is moved due to a gap formed between the article C being suction-held and the suction openings 110 can be reduced. In particular, the suction transfer device of this embodiment is the parallel link robot 30 in which the suction component 100 is moved at a relatively high speed. However, even in a case where the suction component 100 is moved at a relatively high speed, the occurrence of a situation where the article C being suction-held drops can be reduced because the article C is firmly supported by the first surface 104b.

It will be noted that for the first surface 104*b* to firmly support the article C, it is preferred that the first surface 104*b* be a rigid surface rather than a surface that elastically deforms easily. In other words, it is preferred that the article support member 104 be a rigid member. It will be noted that "rigid surface" here does not mean a surface that does not deform at all. Furthermore, "Rigid surface" and "rigid member" here mean a surface and member that do not deform much (substantially do not deform) even if the article C is pressed against them when the article C is suction-held.

On the other hand, when the article C is directly pressed against the first surface 104*b* that is a rigid surface, there is a concern that the bag of the article C will be damaged when it comes into contact with the first surface 104*b*. Thus, as shown in FIG. 7, it is preferred that the buffer member 106 be provided on the first surface 104*b* to avoid direct contact between the first surface 104*b* and the bag of the article C and suppress damage to the bag of the article C. For example, the buffer member 106 is attached to the first surface 104*b* so as to cover the first surface 104*b*. The buffer member 106 is, for example, made of rubber. It will be noted that the thickness of the buffer member 106 here can be thin because the buffer member 106 is not required to have the function of allowing the surface thereof that contacts the article C deform much in conformity with the shape of the article C. For example, the thickness of the buffer member 106 is 3 to 5 mm, though the thickness is not limited.

The article C is a bag-like article that deforms easily. For that reason, when the negative space Sn is formed inside the negative pressure chamber 102, the bag of the article C deforms, and part of the bag is easily pulled inside the negative pressure chamber 102 through the suction openings 110. When part of the bag of the article C is pulled inside the negative pressure chamber 102 through the suction openings 110 in this way, the article C tends to be firmly held at the suction openings 110. Thus, it is preferred that the negative pressure chamber 102 have a depth D equal to or greater than a predetermined value to ensure space for pulling in the bag of the article C (see FIG. 7). It will be noted that the depth D of the negative pressure chamber 102 is the depth of the negative pressure chamber 102 in a direction heading toward the space inside the negative pressure chamber 102 from the suction openings 110. In other words, the depth D of the negative pressure chamber 102 is the depth of the negative pressure chamber 102 in a direction orthogonal to the opening surface of the suction openings 110 from the suction openings 110. Preferably, the depth D of the negative pressure chamber 102 from the suction openings 110 is equal to or greater than 4 mm. In this way, because the negative pressure chamber 102 has the relatively large depth D, the article C can be firmly held at the suction openings 110.

There is the above-described advantage in the bag of the article C being pulled inside the negative pressure chamber 102 through the suction openings 110. On the other hand, if the bag of the article C pulled inside the negative pressure chamber 102 were to get caught on a member inside the negative pressure chamber 102, there is a concern that the suction component 100 will be unable to quickly cancel the suction-holding of the article C when the suction component 100 releases the article C (in this embodiment, when the suction component 100 places the article C on the second conveyor 20). For that reason, it is preferred that the suction component 100 employ a structure/mechanism by which the bag of the article C quickly comes out of the negative pressure chamber 102 when the suction component 100 cancels the suction-holding of the article C, even in a case where part of the bag of the article C has been pulled inside the negative pressure chamber 102 through the suction openings 110. Specifically, it is preferred that the suction component 100 employ the following kind of structure/mechanism.

The suction component 100 has a second surface 102*a* that extends from the suction openings 110 into the negative pressure chamber 102 and intersects the first surface 104*b*. The second surface 102*a* is a side surface of the negative pressure chamber 102 that extends from the suction openings 110 formed in the article support member 104 into the negative pressure chamber 102 and surrounds the negative pressure space Sn. It is preferred that the angle formed by the first surface 104*b* and the second surface 102*a* be greater than 180° and equal to or less than 270°. For example, as shown in FIG. 7, an angle θ formed by the first surface 104*b* and the second surface 102*a* is 270°. Furthermore, for example, as shown in FIG. 8, an angle θ' formed by the first surface 104*b* and the second surface 102*a* is greater than 180° and smaller than 270°. By setting the angle formed by the first surface 104*b* and the second surface 102*a* greater than 180° and equal to or less than 270°, the occurrence of a situation where the bag-like article C gets caught on the member forming the second surface 102*a* can be reduced.

Furthermore, it is preferred that the suction component 100 have, as a structure/mechanism for allowing the bag of the article C to quickly come out of the negative pressure chamber 102, the pull-in inhibiting member 108 as shown in FIG. 7. The pull-in inhibiting member 108 is a tabular member that is disposed in the negative pressure chamber 102. The pull-in inhibiting member 108 is a member that is disposed adjacent to the side surface of the negative pressure chamber 102. The pull-in inhibiting member 108 can be disposed in the negative pressure chamber 102 in such a way that it is in contact with the side surface of the negative pressure chamber 102 or can be disposed in the negative pressure chamber 102 in such a way that there is a gap between it and the side surface of the negative pressure chamber 102. The pull-in inhibiting member 108 has a third surface 108*a* that extends in a direction intersecting the second surface 102*a*, that is, the side surface of the negative pressure chamber 102. For example, in FIG. 7, the third surface 108*a* extends in a direction orthogonal to the second surface 102*a*. Because of the presence of the pull-in inhibiting member 108, the occurrence of a situation where the bag of the article C is pulled too much inside the negative pressure chamber 102 and, when the suction-holding of the article C is canceled, the bag-like article C gets caught in the negative pressure chamber 102 such that quick release of the article C is obstructed can be reduced. It will be noted that the pull-in inhibiting member 108 can also be omitted in a case where the depth D of the negative pressure chamber 102 is relatively shallow.

Moreover, the suction component 100 can also have, as a structure/mechanism for quickly canceling the suction-holding of the article C, an air discharge component 112 having air outlets 112*a* in a position inside the negative pressure chamber 102 such as shown in FIG. 5. It will be noted that the number and positions of the air outlets 112*a* shown in FIG. 5 are merely illustrative and can be appropriately changed.

The air discharge component 112 is configured to be capable of discharging, from the air outlets 112*a*, compressed air supplied by a tube not shown in the drawings. The air outlets 112*a* are configured to discharge the compressed air toward the suction openings 110. The controller 36 of the parallel link robot 30 controls the air discharge component 112 to discharge the compressed air from the air outlets 112a toward the suction openings 110 when canceling the suction-holding of the article C by the suction component 100.

It will be noted that usually the bag-like article C suction-held by the suction component 100 does not have a fixed shape, so in a case where the posture of the suction component 100 does not change, there is the potential for it to become difficult for the first surface 104b to be brought into firmly tight contact with the article C. On the other hand, if the first surface 104b of the suction component 100 is configured as a surface that deforms easily, there is the concern that it will become difficult to firmly support the article C.

Thus, it is preferred that the parallel link robot 30 have a support component 120 that supports the suction component 100 in such a way that the suction component 100 can change its posture. The support component 120 is provided on the upper portion of the suction component 100. The aforementioned parallel link arms 34 hold the suction component 100 via the support component 120. The support component 120 is, for example, an elastic member made of rubber. It is preferred that the support component 120 deformed a relatively great extent to allow the posture of the suction component 100 to change. Furthermore, the support component 120 can also have a shape that deforms easily in addition to using a material that elastically deforms easily. For example, the support component 120 can have an accordion shape.

(4) Characteristics of Suction Transfer Device (4-1)

The parallel link robot 30 serving as an example of the suction transfer device of the embodiment suction-holds the bag-like article C with the suction component 100 and moves the suction component 100 suction-holding the article C to thereby transfer the article C. The suction component 100 has the negative pressure chamber 102, one or more suction openings 110, and the first surface 104b. The negative pressure chamber 102 forms the negative pressure space Sn inside when the negative pressure generator 130 is driven. The suction openings 110 communicate with the negative pressure chamber 102. The first surface 104b is disposed around the suction openings 110 and opposes an article C subjected to suction. The area A1 of the first surface 104b is from 0.5 times to 2 times the area Ac of the sucked surface, which opposes the first surface 104b, of the article C subjected to suction.

In this parallel link robot 30, when forming negative pressure in the space inside the negative pressure chamber 102 to suction-hold the bag-like article C at the suction openings 110, the article C can be firmly supported by the first surface 104b of the suction component 100 for which a relatively large area is ensured. For that reason, the occurrence of a situation where a gap forms between the bag-like article C being suction-held and the suction openings 110 such that the article C being suction-held drops when the suction component 100 sucking the article C is moved can be reduced.

(4-2)

In the parallel link robot 30 of the embodiment, the total opening area A2 of the suction openings 110 is from 0.3 times to 0.6 times the area Ac of the sucked surface of the article C subjected to suction. In the embodiment, the total opening area A2 is given by the sum of the opening area A21, the opening area A22, and the opening area A23.

In this parallel link robot 30, by ensuring the suction openings 110 with the above-described area, a sufficient size can be ensured for the first surface 104b that supports the bag-like article C, and the article C can be firmly suction-held by the suction openings 110.

(4-3)

In the parallel link robot 30 of the embodiment, the opening areas A21, A22, and A23 of the suction openings 110 are each equal to or greater than 9 mm$^2$.

In the case of forming negative pressure in the space inside the negative pressure chamber 102 to suck the article C, a greater suction-holding force at each suction opening 110 can be ensured the larger each suction opening 110 is. In this parallel link robot 30, because each suction opening 110 has a relatively large opening area, the article C can be firmly suction-held by each suction opening 110, and the occurrence of a situation where each suction opening 110 ends up unintentionally releasing the article C is easily reduced.

(4-4)

In the parallel link robot 30 of the embodiment, the depth D of the negative pressure chamber 102 from the suction openings 110 is equal to or greater than 4 mm.

In this parallel link robot 30, by ensuring a relatively large depth for the negative pressure chamber 102, the bag-like article C deformed by suction can be received inside the negative pressure chamber 102 and can be firmly held.

(4-5)

In the parallel link robot 30 of the embodiment, the suction component 100 has the second surface 102a that extends from the suction openings 110 into the negative pressure chamber 102 and intersects the first surface 104b. The angle θ, θ' formed by the first surface 104b and the second surface 102a is greater than 180° and equal to or less than 270°.

In this parallel link robot 30, by setting the angle θ, θ' formed by the first surface 104b and the second surface 102a in the above-described angular range, the occurrence of a situation where the bag-like article C gets caught on the member forming the second surface 102a can be reduced. For that reason, in this parallel link robot 30, after the bag-like article C has been transferred to a desired position (in the embodiment, after the article C has been transferred to a predetermined position on the second conveyor 20), the suction-holding can be quickly canceled to promptly transition to the process of transferring the next article C. As a result, an increase in the speed of the suction transfer process can be realized.

(4-6)

In the parallel link robot 30 of the embodiment, the suction component 100 has the third surface 108a that is disposed in the negative pressure chamber 102 and extends in a direction intersecting the second surface 102a.

In this parallel link robot 30, the bag-like article C is inhibited, by the third surface 108a, from being excessively pulled into the negative pressure chamber 102. For that reason, in this parallel link robot 30, the occurrence of a situation where the bag-like article C gets caught in the negative pressure chamber 102 such that quick release of the article C is obstructed when canceling the suction-holding of the article C can be reduced.

(4-7)

In the parallel link robot 30 of the embodiment, the first surface 104b is a rigid surface.

In this parallel link robot 30, the first surface 104b is a rigid surface. Therefore, compared to a case where the first surface 104b deforms easily, a gap is less likely to be formed between the first surface 104b and the bag-like article C. It is thus easy to firmly support the article C.

(4-8)

In the parallel link robot 30 of the embodiment, the suction component 100 has the buffer member 106 that is provided on the first surface 104b.

In this parallel link robot 30, the buffer member 106 is provided on the first surface 104b. Therefore, the bag-like article C and the item inside the bag can be reduced from contacting the first surface 104b and sustaining damage.

(4-9)

In the parallel link robot 30 of the embodiment, the suction component 100 is equipped with the air discharge component 112 that has the air outlets 112a disposed inside the negative pressure chamber 102 and discharges air toward the suction openings 110.

This parallel link robot 30 is configured to be capable of discharging air from inside the negative pressure chamber 102 toward the suction openings 110. For that reason, in this parallel link robot 30, when canceling the suction-holding of the article C by the suction component 100, air can be applied to the article C that had been held at the suction openings 110 to thereby quickly cancel the suction-holding.

(4-10)

The parallel link robot 30 of the embodiment includes the support component 120 that supports the suction component 100 in such a way that the suction component 100 can change its posture.

The bag-like article C that is subjected to suction-holding and transfer by this parallel link robot 30 deforms easily. For that reason, in contrast to an article that virtually does not deform such as an article that is put into a box, there is the potential for the same article C to take various shapes. In this parallel link robot 30, the suction component 100 is supported in such a way that it can change its posture. Therefore, it is easy to change the direction the suction openings 110 and the first surface 104b face in conformity with the shape of each article C and to firmly suction-hold the article C.

(5) Example Modifications

Example modifications of the embodiment are described below. It will be noted that some or all characteristics of each of the following example modifications can also be combined with those of another example modification to the extent that they are not mutually incompatible.

(5-1) Example Modification A

In the above embodiment, the first surface 104b of the suction component 100 is a flat surface, but the first surface 104b is not limited to a flat surface. The first surface of the suction component 100 can also be a curved surface, for example.

If an item to be packaged is packed into a bag at a high fill rate, there are cases where the shape of the bag becomes such that the bag is thicker at its central portion and thinner at its edge portions. The first surface of the suction component 100 can be formed in the shape of an arch or the shape of a dome to conform to the shape of such bags.

Figure 9:
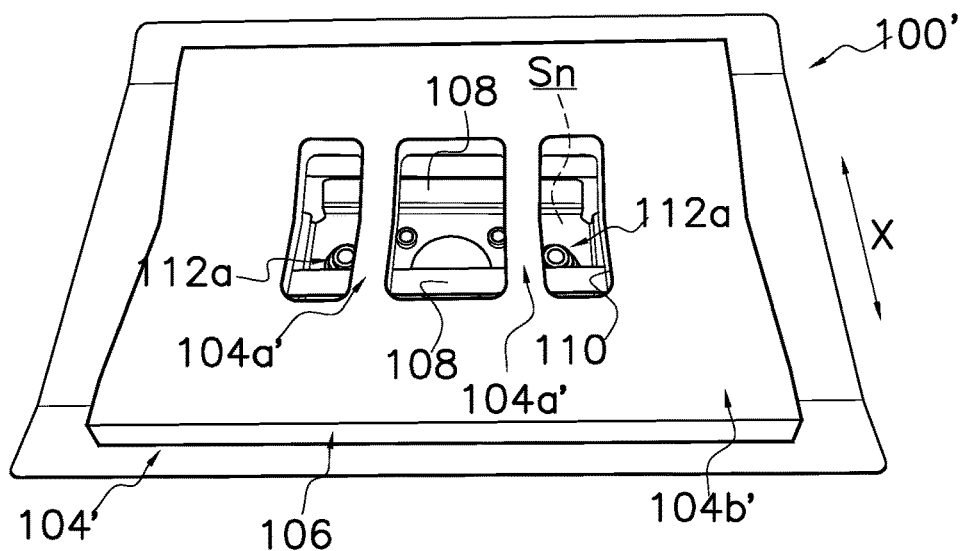
FIG. 9 is a perspective view of a suction component of the suction transfer device pertaining to example modification A as seen from its bottom surface side in which the suction openings are formed.

For example, FIG. 9 shows a suction component 100' equipped with an article support member 104' that has an arch-shaped first surface 104b' whose central portion is recessed with respect to its edge portions. It will be noted that although in FIG. 9 the entire first surface 104b' is formed in the shape of an arch, the first surface 104b' is not limited to this, and just the portions of divider portions 104a' that particularly contact the thick portion of the article C can also be formed in the shape of an arch.

It will be noted that although illustration is omitted, "dome-shaped first surface" means a first surface having a shape in which the center is recessed with respect to the edge portions of the first surface generally in all directions.

(5-2) Example Modification B

In the embodiment, three suction openings 110 divided by divider portions 104a extending in the same direction are formed in the article support member 104 of the suction component 100.

Figure 10:
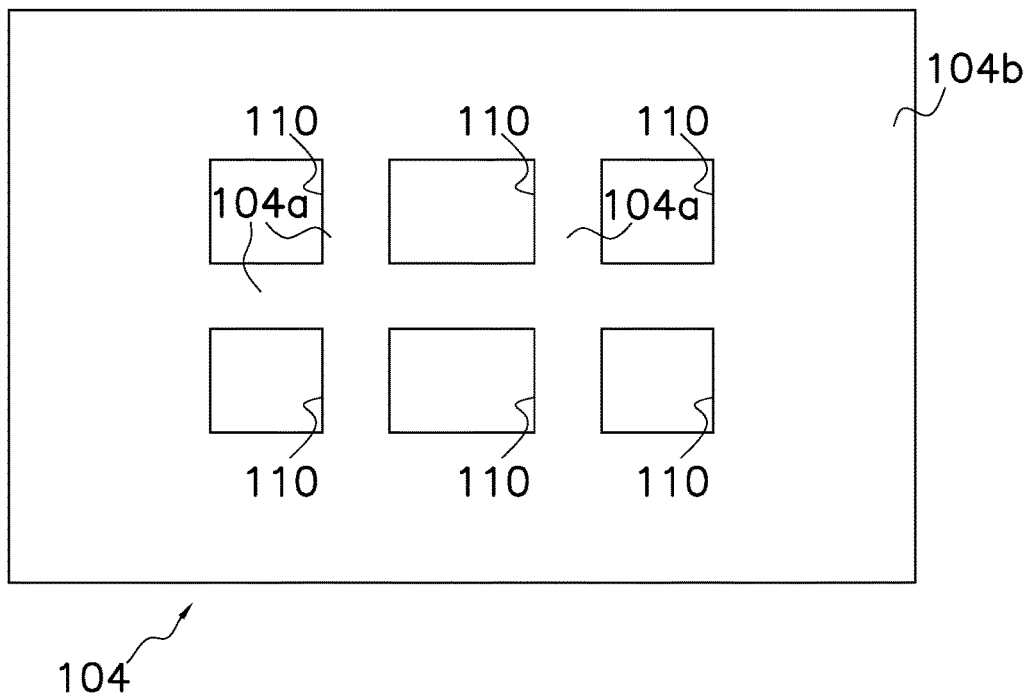
FIG. 10 is a schematic plan view of the article support member of the suction component of the suction transfer device pertaining to example modification B as seen from its first surface side.

However, the way in which the suction openings 110 are divided is not limited to the way described in the embodiment, and plural suction openings 110 divided by divider portions 104a extending in a first direction and divider portions 104a extending in a direction intersecting the first direction can also be formed in the article support member 104. For example, FIG. 10 shows the article support member 104 in which are formed six suction openings 110 divided by divider portions 104a extending in a first direction and divider portions 104a extending in a direction orthogonal to the first direction.

(5-3) Example Modification C

In the embodiment, the suction openings 110 are rectangular openings, but the shape of the suction openings 110 can be arbitrarily decided. For example, the suction openings 110 can also have a circular, elliptical, or other shape.

Furthermore, in the embodiment, the article support member 104 is a rectangular member in bottom view, but the shape of the article support member 104 can be arbitrarily decided. For example, the article support member 104 can also have a circular, elliptical, or other shape.

REFERENCE SIGNS LIST

30 Parallel Link Robot (Suction Transfer Device)
100 Suction Component
102 Negative Pressure Chamber
102a Second Surface
104b First Surface
106 Buffer Member
108a Third Surface
110 Suction Openings
112 Air Discharge Component
112a Air Outlets
120 Support Component
130 Negative Pressure Generator
A1 Area of First Surface
A2 Total Opening Area of Suction Openings
A21, A22, A23 Areas of Suction Openings
Ac Area of Sucked Surface of Article
D Depth of Negative Pressure Chamber from Suction Openings
Sn Negative Pressure Space
θ, θ' Angle formed by First Surface and Second Surface

What is claimed is:

1. A suction transfer device that suction-holds a bag-like article with a suction component and moves the suction component suction-holding the article to thereby transfer the article,
the suction component including
a negative pressure chamber configured to form a negative pressure space therein when a negative pressure generator operates,
a port through which the negative pressure generator communicates with the negative pressure chamber to form the negative pressure space when the negative pressure generator operates,
one or more suction openings communicating with the negative pressure chamber,
a first surface disposed around the suction openings and opposing an article subjected to suction, and
an air discharge component that has air outlets disposed inside the negative pressure chamber and that discharges air toward the suction openings.

2. The suction transfer device according to claim 1, wherein opening areas of the suction openings are each equal to or greater than 9 mm$^2$.

3. The suction transfer device according to claim 1, wherein a depth of the negative pressure chamber from the suction openings is equal to or greater than 4 mm.

4. The suction transfer device according to claim 1, wherein
the suction component further includes a second surface that extends from the suction openings into the negative pressure chamber and intersects the first surface, and
an angle formed by the first surface and the second surface is greater than 180° and equal to or less than 270°.

5. The suction transfer device according to claim 4, wherein the suction component further includes a third surface that is disposed in the negative pressure chamber and extends in a direction intersecting the second surface.

6. The suction transfer device according to claim 1, wherein the first surface is a rigid surface.

7. The suction transfer device according to claim 1, wherein the suction component further includes a buffer member provided on the first surface.

8. The suction transfer device according to claim 1, further comprising a support component that supports the suction component such that the suction component changes a posture thereof.

9. The suction transfer device according to claim 1, wherein at least part of the first surface is formed in a shape of an arch or a shape of a dome.

* * * * *